No. 728,719. PATENTED MAY 19, 1903.
C. E. HUTCHINGS & J. A. ROBERTSON.
ADAPTER FOR CONTAINING A FLAT PACKAGE OF FILMS.
APPLICATION FILED OCT. 18, 1902.
NO MODEL. 2 SHEETS—SHEET 1.
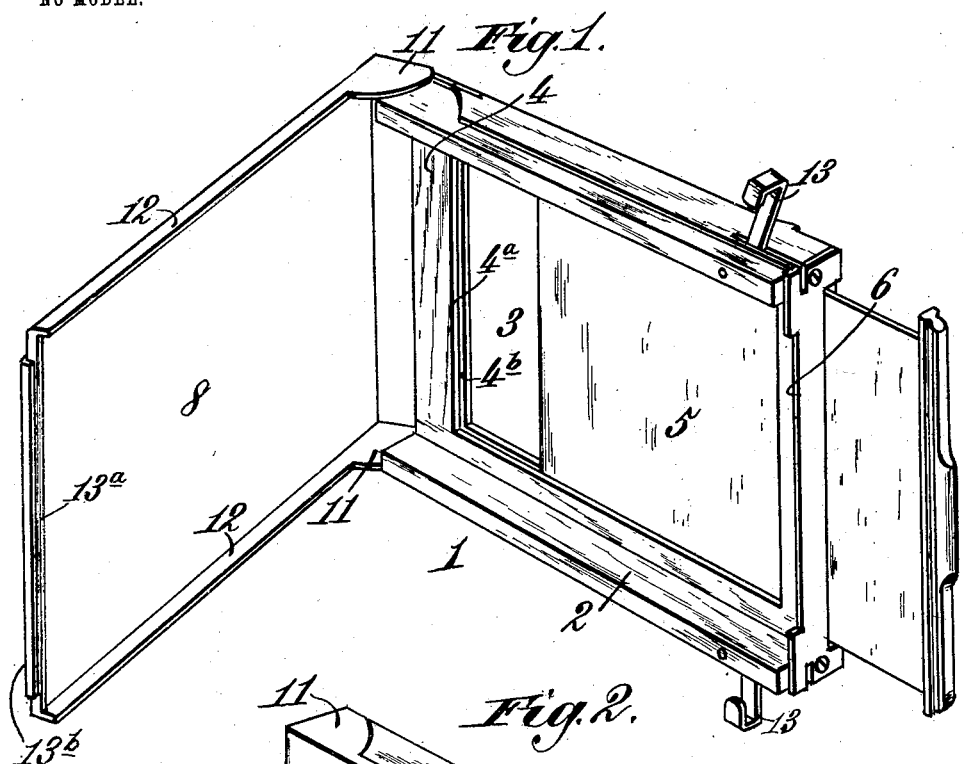
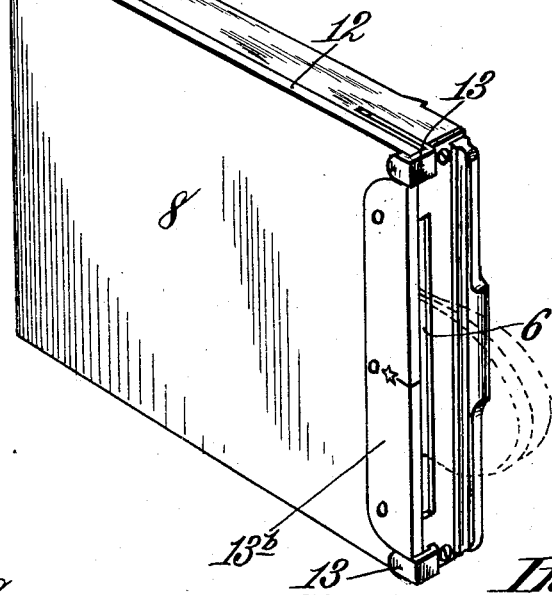
Witnesses.
Robert Everett.
C. D. Kesler.
Inventors.
Charles E. Hutchings.
John A. Robertson.
By James L. Norris.
Att'y No. 728,719. PATENTED MAY 19, 1903.
C. E. HUTCHINGS & J. A. ROBERTSON.
ADAPTER FOR CONTAINING A FLAT PACKAGE OF FILMS.
APPLICATION FILED OCT. 18, 1902.
NO MODEL. 2 SHEETS—SHEET 2.
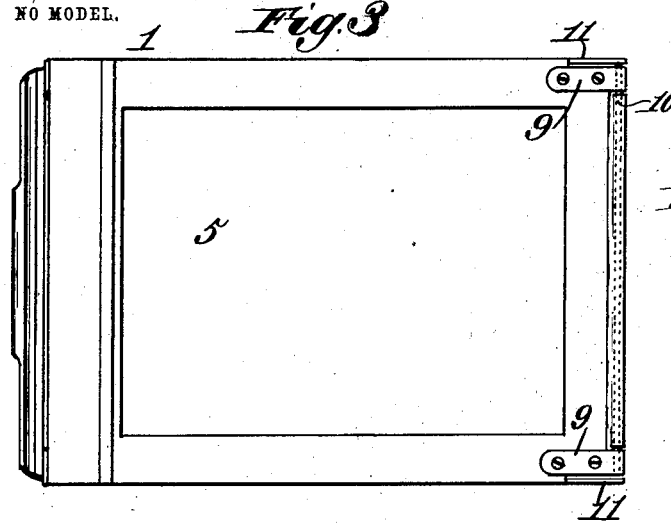
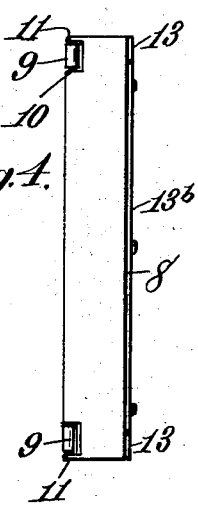
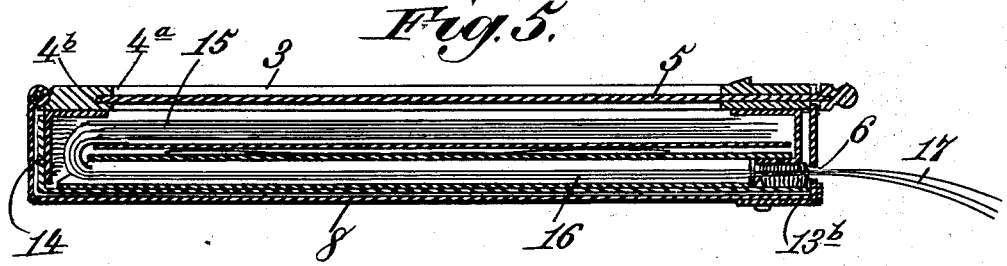
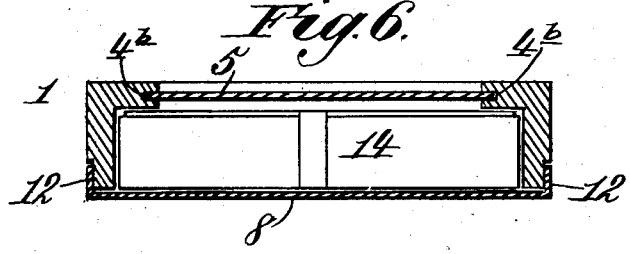
Witnesses.
Inventors.
Charles E. Hutchings.
John A. Robertson.
By James L. Norris.
Atty.

No. 728,719.  
Patented May 19, 1903.

UNITED STATES PATENT OFFICE.

CHARLES E. HUTCHINGS AND JOHN A. ROBERTSON, OF ROCHESTER, NEW YORK, ASSIGNORS TO ROCHESTER OPTICAL & CAMERA CO., OF ROCHESTER, NEW YORK, A CORPORATION OF NEW YORK.

ADAPTER FOR CONTAINING A FLAT PACKAGE OF FILMS.

SPECIFICATION forming part of Letters Patent No. 728,719, dated May 19, 1903.

Application filed October 18, 1902. Serial No. 127,802. (No model.)

*To all whom it may concern:*

Be it known that we, CHARLES E. HUTCHINGS and JOHN A. ROBERTSON, citizens of the United States, residing at Rochester, in the county of Monroe and State of New York, have invented new and useful Improvements in Adapters for Containing a Flat Package of Films, of which the following is a specification.

This invention relates to an improved adapter for containing a flat package comprising a series of separate flat films provided with extensions terminating in film-manipulating tabs exposed and within reach of the operator, said adapter with such contained package of films being adapted to be combined for use with a photographic camera.

To the end stated the invention consists in the novel construction of adapter hereinafter described and claimed, reference being made to the accompanying drawings, in which the adapter is shown in a form adapted to be inserted between the camera box or case and the well-known construction of spring-back.

In the said drawings, Figure 1 illustrates a perspective view of the improved adapter open for the introduction or reception of a package of films; Fig. 2, a similar view of the adapter closed with a package of films contained therein, the exposed manipulating-tabs being shown in dotted lines; Fig. 3, a rear view showing a manner of connecting the hinged cover; Fig. 4, a bottom view; Fig. 5, a sectional view of the adapter and the contained package of films. Fig. 6 is a transverse section.

It is well known that what are termed "daylight-loading" cameras, in which the film in a continuous roll is wound upon a spool, exist, and in the art a demand has arisen for a storage of films in a flat or plate-like condition, such as may be employed in connection with cameras constructed especially for the reception of plates and which embodies the daylight-loading idea.

It is particularly the object of this invention to provide an adapter or holder constructed to contain a package of films arranged in a flat condition similar to the condition of a plate and which may be combined with or inserted into a camera construction substantially as a plate-holder is now introduced into or combined with such camera construction. We do not, however, confine our claims to an adapter restricted to a particular manner of use, the invention relating to the novel adapter hereinafter claimed, irrespective of the manner of combining it operatively with a camera.

In the said drawings the reference-numeral 1 designates generally the improved adapter, composed of a body 2, constituting a receptacle for a package of films and having an opening 3, which in the present instance is in the rear of the body portion 2, through which the package of films may be introduced into the adapter, and provided also with an exposure-opening 4, through which the series of films comprising the package may be exposed. The exposure-opening is provided with surrounding flanges $4^a$, which form a seat $4^b$ for the package of films and between which flanges and the hereinafter-referred-to cover the package of films is firmly held.

The numeral 5 indicates a slide to be inserted into and withdrawn from the adapter to close and open the exposure-opening.

The body of the adapter is provided with a passage 6, through which the extensions of opaque backing-sheets 7 and the film-manipulating tabs are passed and through which the extensions of the opaque backing-sheets of the several films may be drawn successively after the films carried thereby have been exposed.

The numeral 8 indicates a hinged cover for the opening through which the package of films is introduced into the adapter and which in the embodiment of the invention illustrated serves, with the flanges $4^a$, to confine or hold the package of films in place.

In the particular form of the invention illustrated in the drawings the opening for introducing the package of films into the adapter is at the rear, and the cover therefor is hinged at the lower portion of the adapter by means of a pair of strap-hangers 9, which support a pintle 10, to which the hinged cover is connected. The hinged cover is provided with a pair of curved extensions 11, which serve as guards to prevent the accidental displacement or loss of the pintle and also as lateral guides to facilitate the accurate closing of the hinged cover. These extensions, together with edge flange 12 of the cover, fit in countersunk recesses in the sides of the body 1 of the structure and prevent any lateral displacement or wabbling of the hinged cover, as well as insure that when closed and in operative position the adapter shall present a substantially rectangular configuration without obtrusions or obstructions. The cover is held closed against the body of the adapter by means of swinging catches 13.

The cover is provided with a flange $13^a$, which constitutes a side wall of the passage 6, and the edge thereof constitutes a guide and tearing edge for facilitating the accurate tearing off of the extensions of the opaque backing-sheets of the films. The cover is preferably of quite thin material for lightness of weight, and to render the flange $13^a$ thereof an efficient tearing edge it is reinforced by a support $13^b$, riveted or otherwise suitably secured along the edge of the cover. This support is provided with a flange which fits over the flange $13^a$ of the cover, as shown, and affords effectual support and rigidity to the tearing edge.

In practice the package of films 14, provided with backing-sheets 15, having extensions 16, terminating in film-manipulating tabs 17, is introduced into the adapter, as shown, with the tabs projecting through the opening 6. The adapter, with the contained package of films and the appurtenances thereof, as described, will then be introduced into or combined with a photographic camera in any suitable known manner, as are the familiar plate-holders.

This adapter is designed particularly to receive the film-packages of the generic character disclosed in our concurrent application for Letters Patent for improvement in film-packages, although we do not restrict ourselves to the character of the film-packages in connection with which the adapter is to be employed, our invention as claimed in this application relating to the adapter as an article of manufacture.

Having thus described our invention, what we claim is—

1. An adapter for containing a flat package of films adapted to be combined for use in a photographic camera, comprising a body portion constituting a receptacle for the package of films and having at one side an exposure-opening and at the other side an opening for the introduction of the package of films, and having also a passage for film-manipulating tabs, a cover for the opening through which the package of films is introduced, hinged at one edge to the body portion, movable catches carried by the body portion for engaging the free end of the hinged cover, and a slide for the exposure-opening.

2. An adapter for containing a flat package of films adapted to be combined for use in a photographic camera, comprising a body portion having an exposure-opening, an opening for the introduction of a package of films, and a passage for film-manipulating tabs, and a hinged cover for the opening through which the package is introduced, said cover provided with guide extensions.

3. An adapter for containing a flat package of films adapted to be combined for use in a photographic camera, comprising a body portion having an exposure-opening, an opening for the introduction of a package of films and a passage for film-manipulating tabs, a hinged cover for the opening through which the package is introduced provided with guide extensions, and a slide for the exposure-opening.

4. An adapter for containing a flat package of films, adapted to be combined for use with a photographic camera, comprising a body portion provided with countersunk recesses and having an exposure-opening, an opening for the introduction of a package of films, a passage for film-manipulating tabs, and a hinged cover for the opening through which the package is introduced provided with guide extensions and edge flanges fitting the countersunk recesses of the body portion.

5. An adapter for containing a flat package of films adapted to be combined for use in a photographic camera, comprising a body portion having an exposure-opening, an opening for the introduction of a package of films, and a passage for film-manipulating tabs, a hinged cover for the opening through which the package is introduced, and swinging catches for said cover.

6. An adapter for containing a flat package of films adapted to be combined for use in a photographic camera, comprising a body portion provided with flanges forming a seat for the package of films and having an exposure-opening, an opening for the introduction of the package of films and a passage for film-manipulating tabs.

7. An adapter for containing a flat package of films, adapted to be combined for use in a photographic camera, comprising a body portion provided with flanges forming a seat for a package of films, and having an exposure-opening, an opening for the introduction of the package of films and a passage for film-manipulating tabs, and a cover for the opening through which the package of films is introduced.

8. An adapter for containing a flat package of films, adapted to be combined for use in a photographic camera, comprising a body portion provided with flanges forming a seat for a package of films and having an exposure-opening, an opening for the introduction of a package of films and a passage for film-manipulating tabs, a cover for the opening through which the package is introduced and a slide for the exposure-opening.

9. An adapter for containing a flat package of films, adapted to be combined for use in a photographic camera, comprising a body portion having an exposure-opening, an opening for the introduction of a package of films, and a passage for film-manipulating tabs, and a hinged cover for the opening through which the package is introduced, said cover being provided with a tearing edge.

10. An adapter for containing a flat package of films, adapted to be combined for use in a photographic camera, comprising a body portion having an exposure-opening, an opening for the introduction of a package of films, and a passage for film-manipulating tabs, and a hinged cover for the opening through which the package is introduced, said cover being provided with a reinforcing tearing edge.

In testimony whereof we have hereunto set our hands in presence of two subscribing witnesses.

CHARLES E. HUTCHINGS.
JOHN A. ROBERTSON.

Witnesses:
MARTIN FREIDELL,
BESSIE L. DENNY.